United States Patent [19]
Brown et al.

[11] Patent Number: 5,949,603
[45] Date of Patent: Sep. 7, 1999

[54] SELF SERVO WRITING FILE USING THE WIDEST HEAD

[75] Inventors: Dana Henry Brown; Thomas Charles Christensen; Earl A. Cunningham; Wayne A. Rogelstad, all of Rochester, Minn.

[73] Assignee: International Business Machines Corporation, Armonk, N.Y.

[21] Appl. No.: 09/224,792

[22] Filed: Jan. 4, 1999

Related U.S. Application Data

[62] Division of application No. 08/287,477, Aug. 8, 1994, which is a continuation of application No. 07/896,954, Jun. 11, 1992, abandoned.

[51] Int. Cl.$^6$ .................................................. G11B 21/10
[52] U.S. Cl. .......................................... 360/75; 360/77.02
[58] Field of Search ................................. 360/75, 77.02, 360/77.03, 77.05, 77.06, 77.08

[56] References Cited

U.S. PATENT DOCUMENTS

| | | |
|---|---|---|
| 4,371,902 | 2/1983 | Baxter et al. . |
| 4,414,589 | 11/1983 | Oliver et al. ...................... 360/77.08 X |
| 4,530,019 | 7/1985 | Penniman . |
| 4,530,020 | 7/1985 | Sutton . |
| 4,531,167 | 7/1985 | Berger ............................... 360/77.02 X |
| 4,912,576 | 3/1990 | Janz . |
| 4,945,427 | 7/1990 | Cunningham . |
| 4,969,056 | 11/1990 | Negishi et al. ................... 360/77.03 X |
| 4,987,355 | 1/1991 | Leaper et al. . |
| 5,012,363 | 4/1991 | Mine et al. . |
| 5,109,307 | 4/1992 | Sidman . |
| 5,164,866 | 11/1992 | Sano et al. . |
| 5,416,652 | 5/1995 | Lewis ............................... 360/77.02 X |

FOREIGN PATENT DOCUMENTS

| | | |
|---|---|---|
| 59-148186 | 8/1984 | Japan . |
| 61-172282 | 8/1986 | Japan .................................. 360/77.05 |
| 63-211116 | 9/1988 | Japan . |

OTHER PUBLICATIONS

IBM Technical Disclosure Bulletin, Cunningham, "Quad Burst Servo Needing No SYNC ID and having Added Information", vol. 33, NO. 3B, Aug. 1990.

IBM Technical Disclosure Bulletin, Fowler, "Regenerative Clock Technique for Servo Track Writers", vol. 33, No. 5, Oct. 1990, pp. 310–311.

IBM Technical Disclosure Bulletin, Bennet et al., "Writing Servo Patterns in Disk Eiles", vol. 23, No. 3, Aug. 1980. pp. 1234–1235.

IBM Technical Disclosure Bulletin, Elliott, "Data Head Self Servowrite", vol. 32, No. 9A, Feb. 1990, pp. 20–22.

IBM Technical Disclosure Bulletin, Ono, "Self–Servo Writing Method", vol. 33, No. 5, Oct. 1990, pp. 263–265.

*Primary Examiner*—Aristotelis M. Psitos
*Assistant Examiner*—James L Habermehl
*Attorney, Agent, or Firm*—Joan Pennington; Matthew J. Bussan

[57] ABSTRACT

A self servo writing file and method for writing servo patterns in a direct access storage device are provided. First servo information is written on a data storage media at a first crash stop. The transducer heads are moved offset from the written servo information while reading the last written servo information until the detected servo signal equals a predetermined value. Then servo information is written on the data storage media responsive to the detected servo signal equal to the predetermined value. The moving and writing steps are sequentially repeated until a second crash stop is reached. A quad-burst servo amplitude pattern or phase pattern can be used for the servo information. The servo writing method is adapted easily for many different servo options. When the file uses a hybrid servo or sector servo, the other surfaces can be written by duplicating the servo bursts with a high bandwidth servo system of the file. Alternatively, the servo writing steps can be repeated for each of the other surfaces for providing head dependent pitch. Variable track pitch can be provided by selectively varying the predetermined value compared with the detected servo signal.

13 Claims, 5 Drawing Sheets

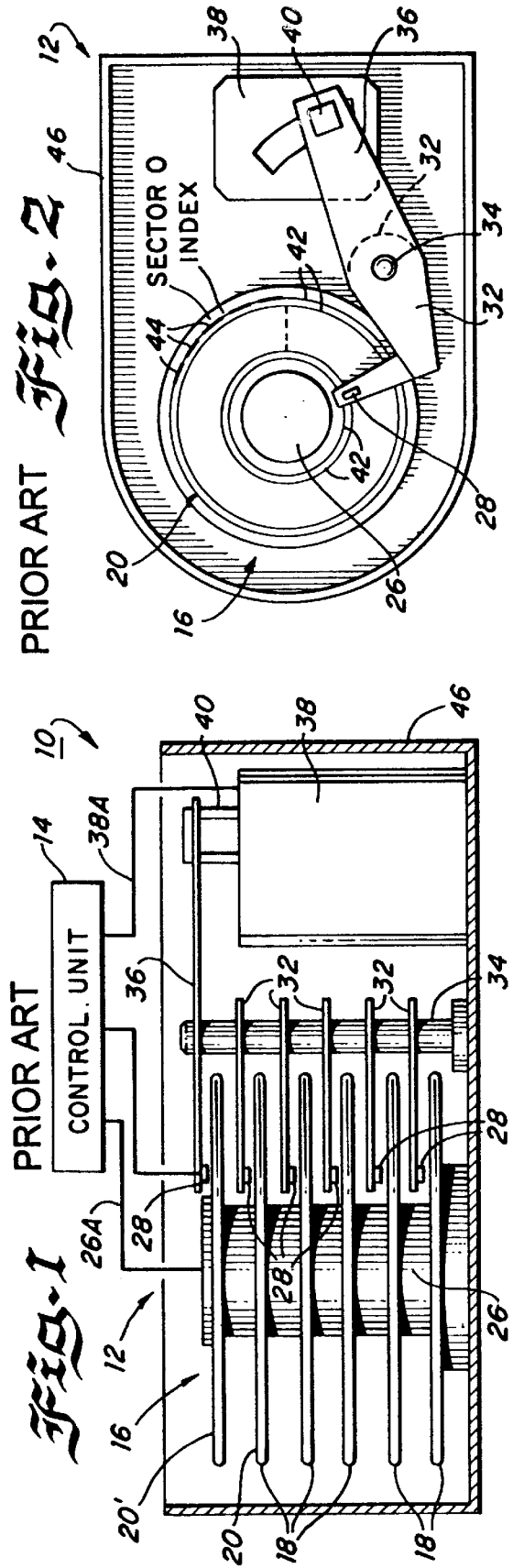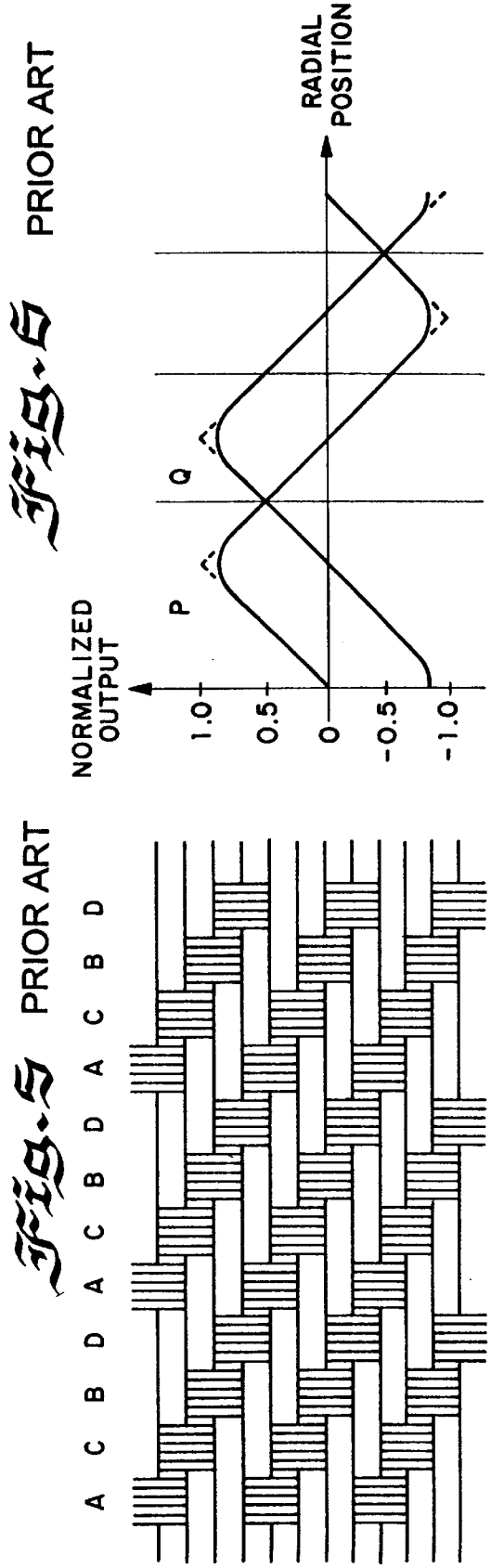

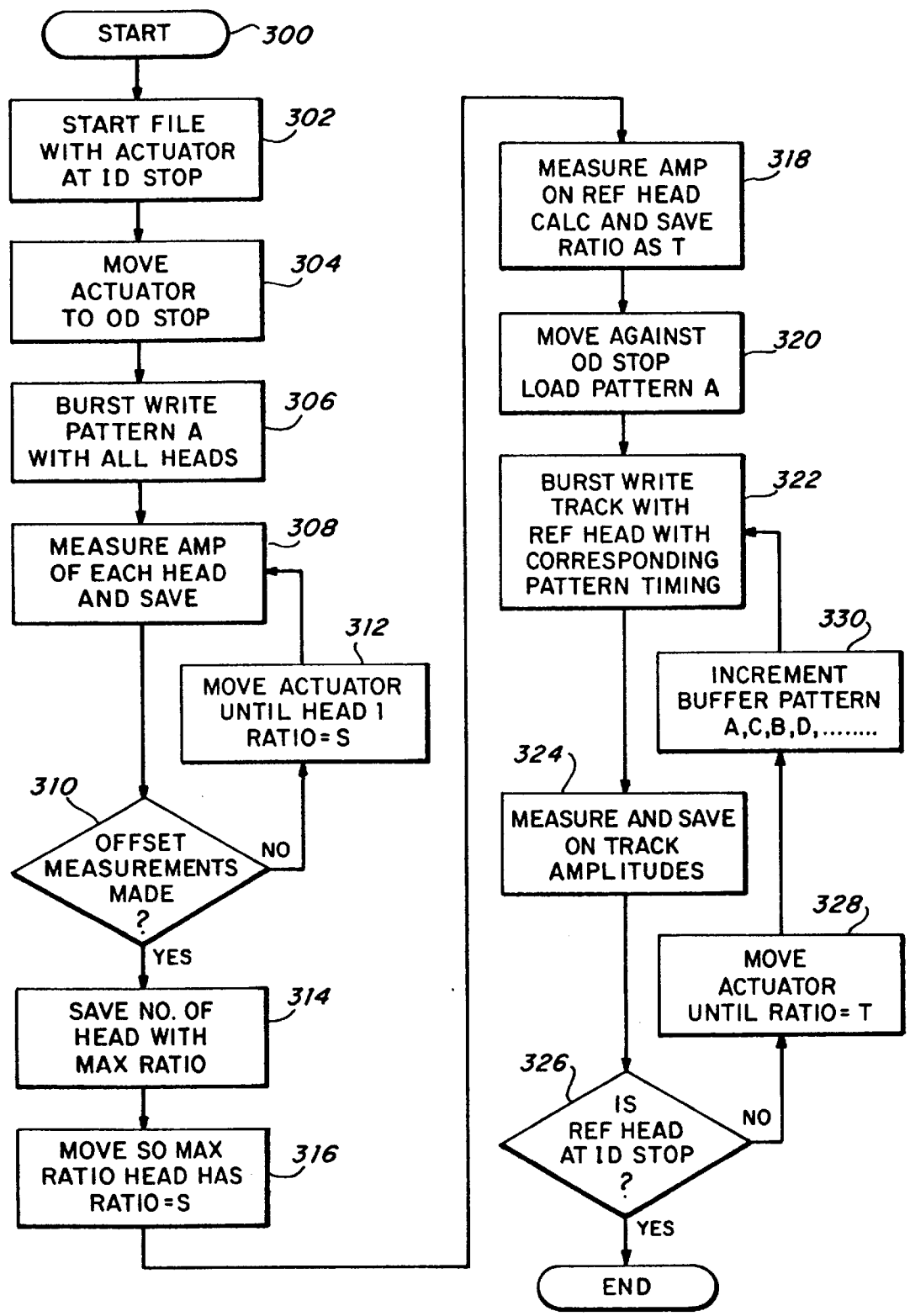

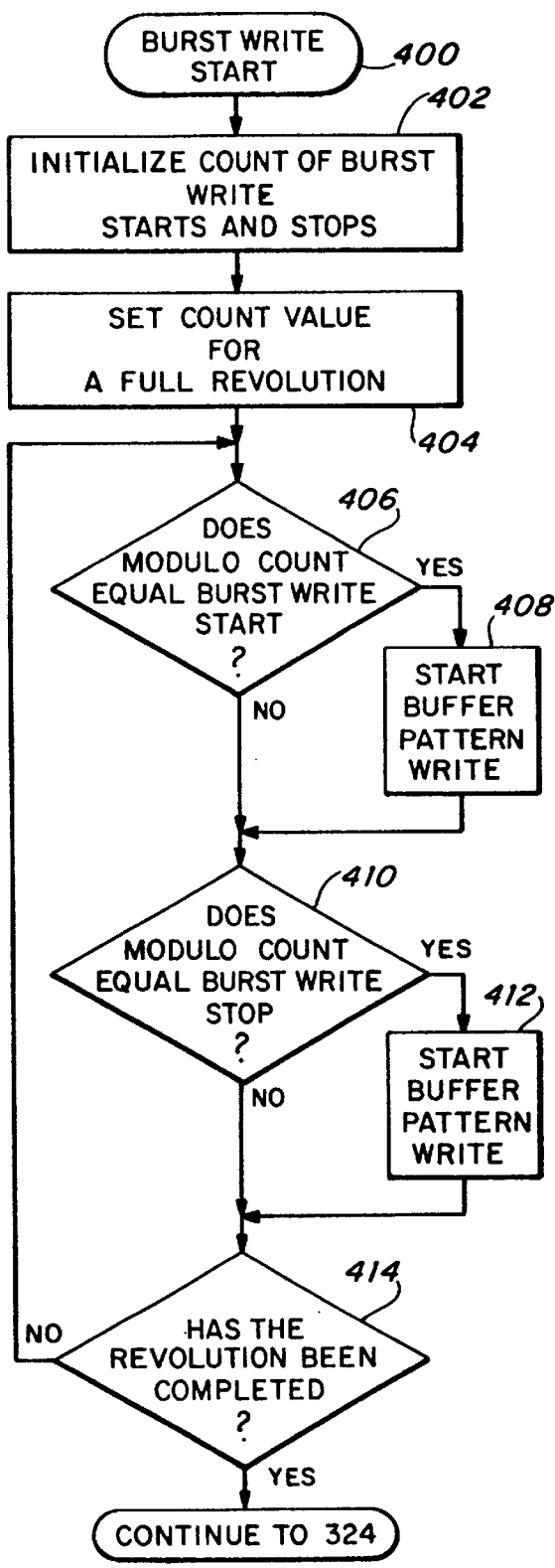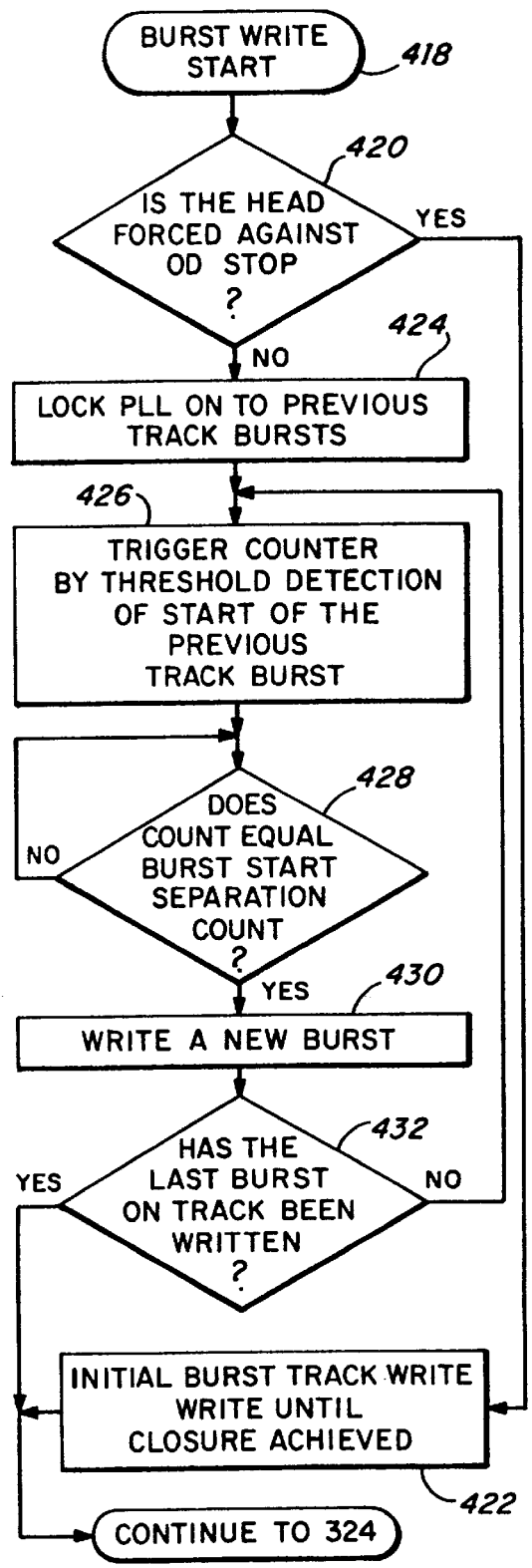

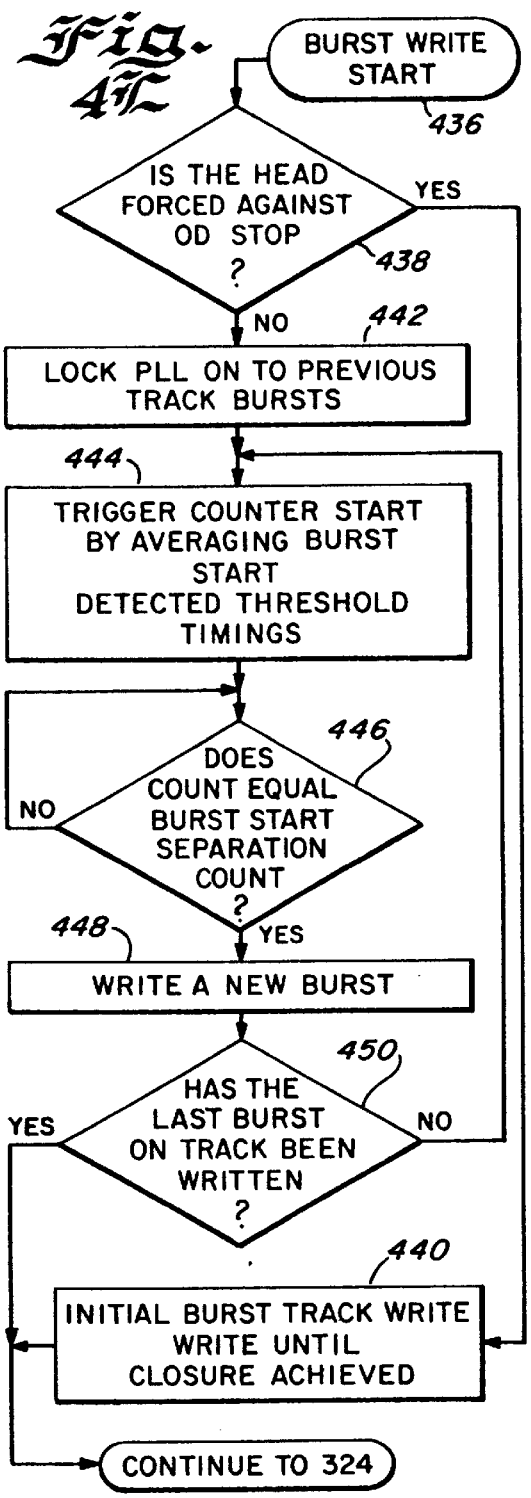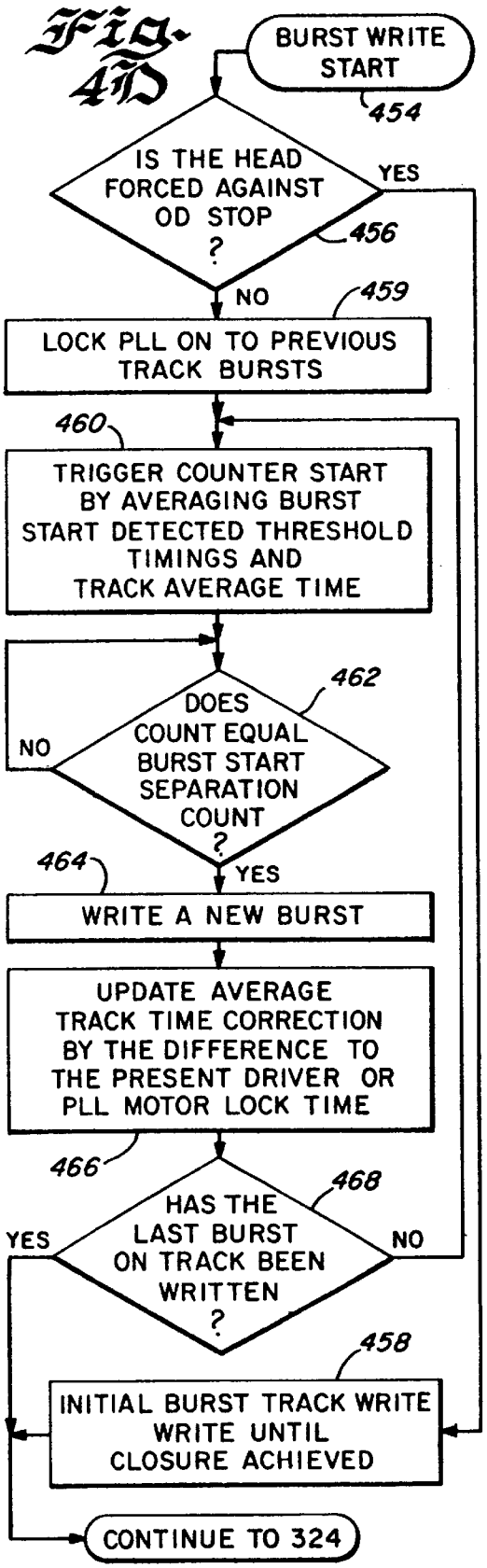

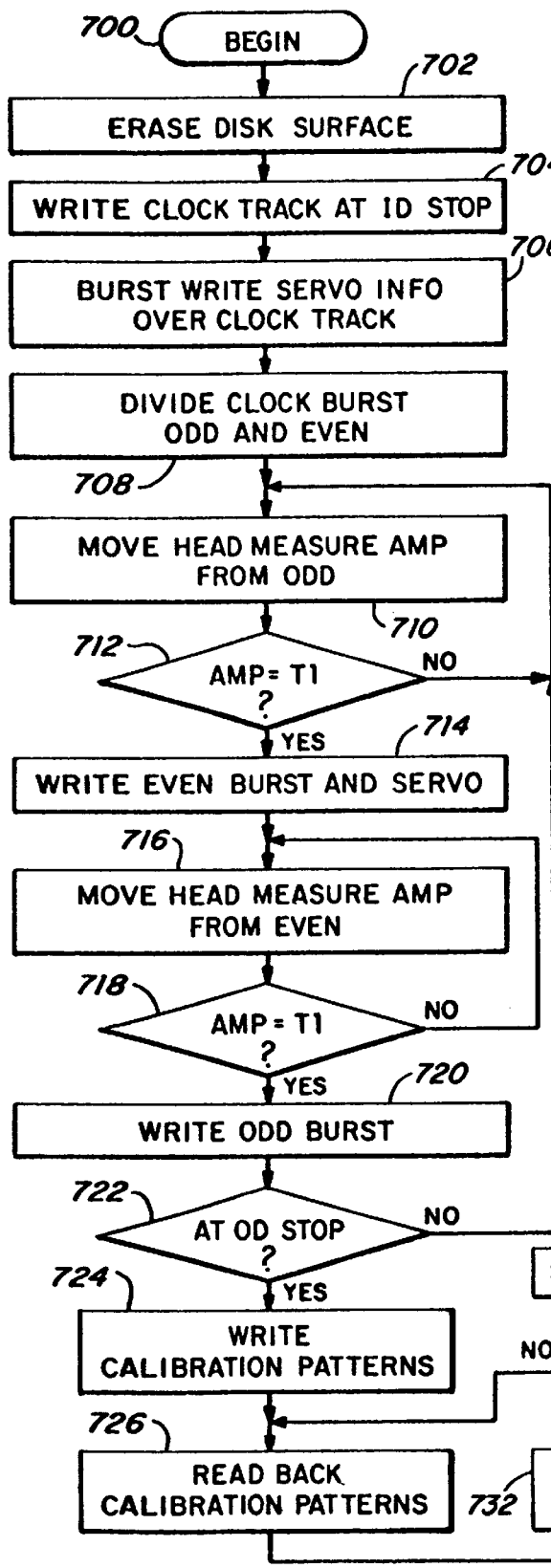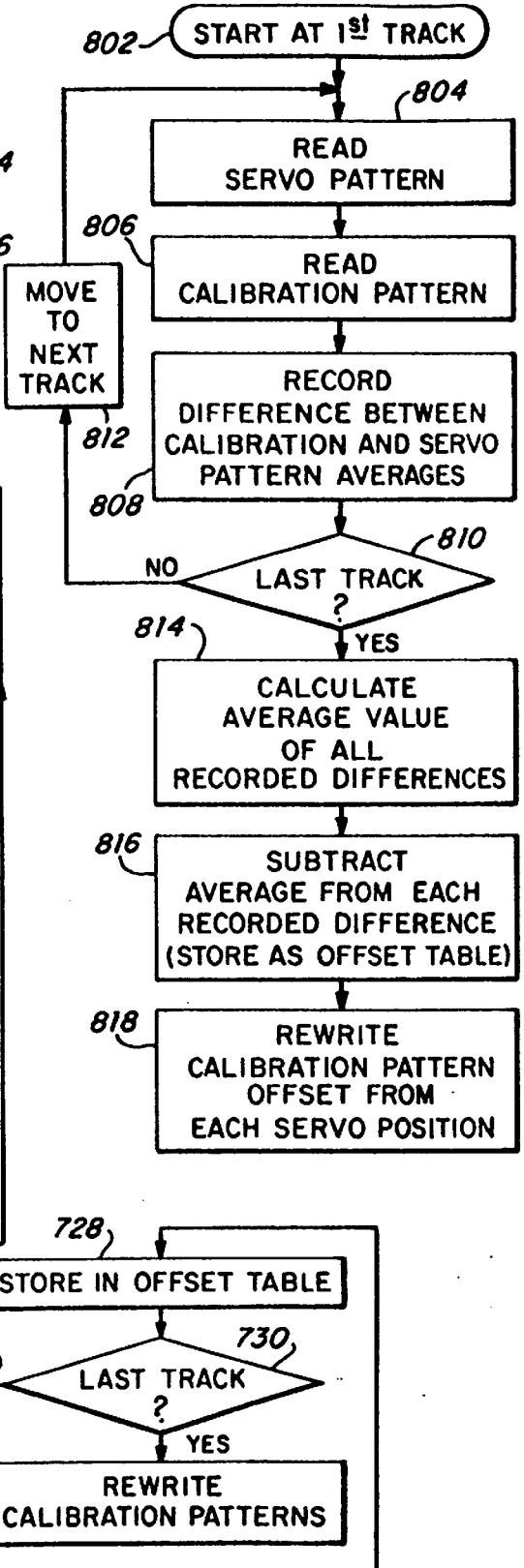

SELF SERVO WRITING FILE USING THE WIDEST HEAD

This application is a divisional application of Ser. No. 08/287,477 filed Aug. 8, 1994 now pending, which is a continuation of Ser. No. 07/896,954, filed on Jun. 11, 1992 now abandoned.

BACKGROUND OF THE INVENTION

1. Field of the Invention

The present invention relates to a direct access storage device (DASD) of the type in which a read/write transducer head is moved above a storage media for reading and writing data, and more particularly to improved servo writing methods and apparatus for a direct access storage device.

2. Description of the Prior Art

Disk drive units incorporating stacked, commonly rotated rigid magnetic disks are used for storage of data in magnetic form on the disk surfaces. Transducer heads driven in a path toward and away from the drive axis write data to the disks and read data from the disks. Data is recorded in concentric data information tracks arrayed on the surfaces of the disks.

All DASD units must have a method to position each data head over the proper radial location to write a track and again, to position it very close to the same location to read the track. With the higher level files using a voice coil type of actuator, a feedback mechanism must be provided to locate and stably hold the head on a given track. Typically, track accessing and track following is provided by a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo.

Typically the servo patterns are written on the disk or disks with a special servo writer system. This system usually includes a laser measured access system to accurately position the heads. This requires a retro-reflector to be attached to the file actuator. The system also includes a clock head or heads to write timing information. Each file that is to be servo written must be firmly clamped to the servo writer to maintain accurate positioning between the two machines. The servo writer must be used in a clean area since the file must be open during the track writing process. This increases the cost and increases the probability of contaminating the file.

In clamping the DASD unit to the servo writer, the natural resonances of the file are significantly changed. Thus while tracks written on the servo writer appear to be nearly perfect, they change when the file is removed and the resonances change, the servo system does not follow the servo tracks perfectly, creating repeatable runout, which makes the determination of being on track difficult.

Examples of other known servo systems are provided by U.S. Pat. Nos. Oliver et al., 4,414,589; Penniman, 4,530,019; and Berger, 4,531,167.

Oliver et al., U.S. Pat. No. 4,414,589 discloses an embedded servo track following system and method for writing servo tracks that does not require a servo writer to write embedded servo data. However, a clock track for very accurate timing is required for providing an index of disc position and a measure of disc speed for writing servo data. The clock track is written by writing a single pulse on a fixed magnetic clock head, phase-lock looping to an intermediate clock track, which is written on a moving head, and then phase-lock looping up to the final clock track which is written on the fixed clock track head.

Berger, U.S. Pat. No. 4,531,167 discloses a portable servo writer system for writing clock and servo tracks either on a dedicated disk surface or embedded servo tracks on disks of a magnetic disk drive. Servo tracks are written by providing a master disk cartridge having one fixed head and a dedicated servo surface. The master disk cartridge is installed on the drive and the servo surface of the drive and the embedded servos are written using prewritten clock and index information from the fixed head of the master cartridge.

Penniman, U.S. Pat. No. 4,530,019 discloses a servo pattern including an erased gap followed by an automatic gain control (AGC) information burst followed by a first burst of servo control information followed by a second burst of servo control information. The pattern is written on a disk by the disk drive unit using a mechanical index on an armature associated with the rotation of the disk as a primary time reference, with all other time references being based on a transition between the erased gap and the AGC burst. While the disclosed servo pattern eliminates the need for a separate clock track, the mechanical index, sensors for the mechanical index, and a positioning system are required for moving the read/write head to write the servo pattern.

While the prior art servo writing devices provide improvements, it is desirable to provide an improved method for writing servo information by the disk file and a self servo writing file where a special servo writer system and prewritten patterns on the disks are not required and further that does not require either a clock track timing reference or substantial different circuitry from the normally available circuitry of the disk file.

SUMMARY OF THE INVENTION

Important objects of the present invention are to provide an improved self servo writing file and methods of writing servo information; to provide improved methods of self servo writing in which variable track width and head dependent pitch are enabled and optimized use of the head/disk capability is supported; and to provide an improved self servo writing file and methods of writing servo information substantially without negative effects and that overcome many disadvantages of those used in the past.

In brief, the objects and advantages of the present invention are achieved by a self servo writing file and method for writing servo patterns in a direct access storage device. First servo information is written on a data storage media at a first crash stop. The transducer heads are moved offset from the written servo information while reading the last written servo information until the detected servo signal equals a predetermined value. Then servo information is written on the data storage media responsive to the detected servo signal equal to the predetermined value. The moving and writing steps are sequentially repeated until a second crash stop is reached. A quad-burst servo amplitude pattern or phase pattern can be used for the servo information. Significant advancements are that no clock head is required to achieve this high bandwidth system while sector placement is maintained in a repeatable radial spoke like arrangement.

In accordance with the invention, the servo writing method is adapted easily for many different servo options. When the file uses a hybrid servo or sector servo, the other surfaces can be written by duplicating the servo bursts or any servo pattern with a high bandwidth servo system. Alternatively, the servo writing steps can be repeated for each of the other surfaces providing head dependent pitch. Variable track pitch can be provided by selectively varying the predetermined value compared with the detected servo signal.

BRIEF DESCRIPTION OF THE DRAWING

The present invention together with the above and other objects and advantages may best be understood from the following detailed description of the embodiment of the invention illustrated in the drawing, wherein:

FIG. 1 is a schematic and simplified vertical sectional view of a rigid magnetic disk drive unit embodying the present invention;

FIG. 2 is a top plan view of the structure shown in FIG. 1;

FIG. 3 is a flow chart illustrating sequential operations of the self servo writing file of the invention;

FIGS. 4A, 4B, 4C and 4D are flow charts illustrating alternative sequential operations of the self servo writing file of the invention;

FIG. 5 illustrates a quad burst servo pattern for the self servo writing file of the invention;

FIG. 6 illustrates servo signals for the self servo writing file of the invention;

FIG. 7 is a flow chart illustrating alternative sequential operations of a self servo writing file of the invention; and FIG. 8 is a flow chart illustrating sequential operations for identifying an offset table and rewriting calibration patterns in the method of the self servo writing file shown in FIG. 7.

DETAILED DESCRIPTION OF THE PREFERRED EMBODIMENT

In FIG. 1 there is shown a partly schematic block diagram of parts of a data storage disk file 10 including a rigid magnetic disk drive unit generally designated as 12 and a control unit generally designated as 14. While a magnetic disk drive unit is illustrated, it should be understood that other mechanically moving memory configurations may be used. Unit 12 is illustrated in simplified form sufficient for an understanding of the present invention because the utility of the present invention is not limited to the details of a particular drive unit construction. After data storage disk file 10 is completely assembled, servo information used to write and read data is written using the disk file 10. The need for prerecorded servo patterns often written with a servo writer system is eliminated.

Referring now to FIGS. 1 and 2 of the drawing, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20. In a disk drive using a dedicated or hybrid servo, one of the disk surfaces 20' stores servo information used to locate information and data on the other disk surfaces 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Although a rotary actuator is shown, it should be understood that a disk drive with a linear actuator can be used. Data storage disk file 10 is a modular unit including a housing 46. The various components of the disk file 10 are controlled in operation by signals generated by control unit 14 such as motor control signals on line 26A and position control signals on line 38A.

Numerous data information tracks 42 are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44 each for containing a predefined size of individual groups of data records which are saved for later retrieval and updates. The data information tracks 42 are disposed at predetermined positions relative to servo information, such as a servo reference index. In FIG. 2 one sector 44 is illustrated as SECTOR O with a fixed index or mark INDEX for properly locating the first data sector. The location of each next sector 44 is identified by a sector identification (SID) pulse read by transducer heads 28 from surfaces 20, 20'.

In FIG. 3, there is shown a flow chart illustrating the self-servo writing accomplished by a boot-strap method of the invention beginning at a block 300. Sequential operations begin with the file started with the actuator at the inner diameter (ID) stop as indicated at a block 302. File 10 is spun up with the actuator latched against the inner (ID) crash stop as indicated at the block 302. Disks 18 in the DASD 10 preferably will have no signal present on the surfaces 20 and 20'. Alternatively, the disk surfaces 20 and 20' will be erased in the file, however this is more difficult.

First the latch is released, and a small current is applied to move the actuator towards the outer crash stop. The actuator bounces to a stop at the outer (OD) crash stop as indicated at a block 304.

A quad-burst servo pattern as disclosed in "QUAD BURST SERVO NEEDING NO SYNC ID AND HAVING ADDED INFORMATION", IBM Technical Disclosure Bulletin Vol. 33, No. 3B, August 1990 advantageously is used. As illustrated in FIG. 5, the quad-burst servo pattern consists of four different base amplitude patterns with the same fundamental frequency. Each of the four pattern types are written in the corresponding offtrack positions separated in time designated by A, C, B, and D. Each burst has the capability of providing self identification. Accurate timing of information between bursts is not required for reading the servo pattern. FIG. 6 illustrates the primary position error signal (PES) or P signal and the quadrature PES or Q signal used for writing the servo pattern. Alternatively, a more standard approach of an ID field and the servo burst could be used for each burst of the amplitude pattern, such that reading the pattern never requires the timing of information between tracks. Note that quad-burst patterns have at least one track width of erased data beside each burst so that no other signal is picked up even if the head is significantly offset from a given pattern.

Each head 28 is used to burst write a servo pattern A at the OD crash stop as indicated at a block 306. The amplitude of each head is measured and saved as indicated at a block 308. As indicated at a decision block 310 offset measurements are made. The offset available by using the reduced track amplitude is less than the physical track width. Since the track width of a head is about ¾ of the desired pitch, an offset of ½ of the track pitch can be used; however, it should be understood that another value may be used if desired. One head is selected arbitrarily indicated as head 1 in a block 312 to servo away from the stop a selected offset, for example, about ½ track. Head 1 is moved until an empirically predetermined ratio S of amplitude at ½ track offset to amplitude on track is detected.

Offset amplitudes of all the heads are measured and then compared to the original amplitudes at block 310. A maximum ratio head having the largest fraction or maximum ratio corresponding to the widest head on the actuator is identified and saved as indicated at a block 314. Then the written pitch is referenced to this maximum ratio head to allow enough room to prevent too much squeeze. This can be used to allow data to be written at larger radii reducing linear density and improving quality or by allowing higher capacity offerings from the same base model file 10.

Other information about the track misregistration (TMR) distribution on different heads, or from a squeeze test can be used to influence the selection of the nominal pitch for the file.

Once the selected pitch is determined, a reference head is selected to be the dominant servo head for writing the file. The reference head can be the widest head saved at the block 314. Alternatively, when a dedicated servo surface or a hybrid servo is to be written, the servo head is selected as the reference head. Other basis for the reference head selection could be the head with the highest signal or signal-to-noise estimate, or a position in the disk stack that is known to have the least TMR.

Then the maximum ratio head is moved until the measured ratio equals the empirically predetermined ratio S as indicated at a block 316. Then the amplitude for the selected reference head is measured and compared with the original amplitude and a ratio T is saved as indicated at block 318.

Next the OD stop outer track is written with the burst pattern of the type defined as A as shown in FIG. 4, if required, as indicated at blocks 320 and 322. On track amplitudes are measured and saved as indicated at a block 324. When the original amplitude track written at block 306 is adequate, it can be used; otherwise, a new pattern A is written at the block 322 with the erase left on between the bursts. When the start to stop timing or spacing of the first to last burst is inadequate, the burst pattern A is rewritten with erase on between bursts until adequate closure is obtained.

A low bandwidth servo system is used so that any written track will not contain any significant amount of repeatable runout, except for small noise deviations, and the head will therefore follow its natural course. The low bandwidth servo requirement prevents the build-up of repeatable runout, that would result if a high bandwidth system were used. The start of write is obtained from a motor pulse for index. The burst patterns are written with bursts phase lock loop (PLL) synchronized to motor revolution.

Next it is determined if the reference head is at the ID crash stop as indicated at a decision block 326. If not, the head actuator is moved offtrack by ½ of the track pitch identified by a measured ratio T for the reference head as indicated at a block 328. Then the buffer pattern is incremented as indicated at a block 330 so that following type A bursts, type C bursts are written at block 322 starting a given time after the start of each type A burst. The current is turned off between the bursts to avoid erasing edges of the previously written bursts.

The servo system measures the average ontrack amplitude of the type C bursts and establishes the threshold level T as the fraction of the measured average amplitude, to be used as the servo reference. The servo system is then switched to the C signal and the head accessed until the amplitude equals the calculated threshold.

Next the sequential steps are repeated and type B bursts are written, timing off the type C bursts. Then the type D bursts are written, timing off the type B bursts. The head is now approximately aligned with the type A bursts written two customer tracks back. The sequential steps are repeated until the reference head reaches the ID crash stop identified at block 326.

To maintain uniform burst spacing, an average timing value between previous track bursts is established. Uniform burst spacing can be accomplished using a given number of cycles of a crystal clock. The clock is high frequency so there are hundreds of cycles counted to establish the nominal burst spacing. The count of the reference clock counter at the time of the previous burst is compared to the expected count and correction is applied for the average error over multiple bursts. When the error indicates the bursts are occurring later on the average than the expected, the burst spacing count is corrected to delay the calculated expected positions. In this way, an averaging of the burst spacings is performed and bursts are written much more uniformly so that the variability of the burst spacing does not significantly accumulate.

This action provides a uniform spacing between bursts. However, there can still be a small timing offset between tracks that can accumulate and can produce a slow change in the circumferential position of the bursts versus radius. The average circumferential position of the bursts can be compared to the motor drive timings. Any error is averaged over a larger period and can also be used to change the number of crystal clock counts per burst. Using this feedback, significant creep of bursts in the circumferential direction versus radius is prevented.

After one whole surface is written, the other surfaces are written for sector servo or hybrid servo files, by switching to the high bandwidth servo using the difference between two bands for the PES, and duplicating the servo bursts onto the other surfaces. For example, with the head centered between the type A and type B bursts, the type C bursts are written on all the other surfaces, multiplexing the read of the A and B signals with the write of the C burst between. In a similar manner, all the other bursts can be duplicated, except the last type on each end of the data band. These are not needed but could be written if desired by moving against the crash stops.

Alternatively the above sequential self-servo writing steps can be performed for separately writing each surface for providing head dependent pitch. In this case, each surface has a different track density, according to the track width of the next head. The use of a pitch to match each head allows more optimum use of each head's capability. Then each head defines the servo and the sequential steps of selecting the widest head for the maximum ratio head are eliminated.

The averaging of burst positions to create a circumferential or angular position reference allows the writing of servo tracks without requiring the use of a clock head. Eliminating use of the clock head is a significant advancement over known arrangements. Typically a clock head has been used to overcome the circumferential timing synchronizing problem on the surface of the disk. Using the motor drive or clock frequency multiples allows synchronization with the disk surface eliminating the need for a clock head.

Even though a clock head is not required, high bandwidth and high burst density can be achieved. The use of the file clock and PLL synchronized motor drive commands allows accurate placement of the servo bursts circumferentially around the track. The accurate burst placement allows a very high density of bursts to be written. The high burst density directly contributes to increasing the servo position sample rate which increases the available servo bandwidth capability. Hence the bandwidth is not limited by the number of motor poles or electrical drive cycles.

The technique for maintaining burst position synchronization with the angular displacement on the disk is key for providing a stable index and an orderly spoke like sector arrangement on the disk surface. This enhances the control over sector positioning on the disk surface and allows optimal arrangement of the sectors for maximum throughput.

It should be understood that for a track density selected either for all surfaces in common, or for each surface separately, it is not necessary to maintain a constant track density across the radial band. The pitch can be selectively varied by using an algorithm to selectively vary the fraction of full amplitude that is detected for moving the actuator in the servo-writing offtrack positioning at block 328.

Referring now to FIGS. 4A, 4B, 4C and 4D, alternative sequential operations of the self servo writing file 10 are illustrated for implementing the burst writing step of block 322 of FIG. 3. In FIG. 4A, the sequential operations begin at a block 400 for a first case with bursts PLL synchronized to motor revolution. Counts of burst write starts and stops are initialized at a block 402 and a count value for a full revolution is set at a block 404. Next at a decision block 406, a modulo count is compared with a burst write start. When equal, the buffer pattern write is started as indicated at a block 408. Otherwise or after starting the buffer pattern write, then at a decision block 410 a modulo count is compared with a burst write stop. When equal, the buffer pattern write is stopped as indicated at a block 412. The sequential operations are repeated returning to the decision block 406, until a completed revolution is identified at a decision block 414. Then the sequential operations continue to block 324 in FIG. 3.

In FIG. 4B, the sequential operations begin at a block 418 for a second case with nonsynchronized triggered burst writes that is subject to greater motor speed variation error. First it is determined if the head is forced against the OD stop at a decision block 420. If yes, then an initial burst track write is performed until closure is achieved as indicated at a block 422 and then the sequential operations continue to block 324 in FIG. 3. Otherwise, a new burst is written by first as indicated at a block 424 to lock the PLL on to previous track bursts, then to trigger the counter by threshold detection of the start of the previous track burst at a block 426. When a count equal to the burst start separation count is identified at a decision block 428, then the new burst is written at a block 430. The sequential operations are repeated returning to block 426, until the last burst on the track has been written identified at a decision block 432. Then the sequential operations continue to block 324 in FIG. 3. In FIG. 4C, the sequential operations begin at a block 436 for a third case with nonsynchronized averaged triggered burst writes that reduces average burst start error. First it is determined if the head is forced against the OD stop at a decision block 438. If yes, then an initial burst track write is performed until closure is achieved as indicated at a block 440 and then the sequential operations continue to block 324 in FIG. 3. Otherwise, a new burst is written by first as indicated at a block 442 to lock the PLL on to previous track bursts, then to trigger the counter start by averaging burst start detected threshold timings at a block 444. When a count equal to the burst start separation count is identified at a decision block 446, then the new burst is written at a block 448. The sequential operations are repeated returning to block 442, until the last burst on the track has been written identified at a decision block 450. Then the sequential operations continue to block 324 in FIG. 3. In FIG. 4D, the sequential operations begin at a block 454 for a fourth case with nonsynchronized averaged triggered burst writes with index correction that reduces average burst start error and corrects for index drift around the revolution. First it is determined if the head is forced against the OD stop at a decision block 456. If yes, then an initial burst track write is performed until closure is achieved as indicated at a block 458 and then the sequential operations continue to block 324 in FIG. 3. Otherwise, a new burst is written by first as indicated at a block 459 to lock the PLL on to previous track bursts, then to trigger the counter start by averaging burst start detected threshold timings and track average time at a block 444. When a count equal to the burst start separation count is identified at a decision block 462, then the new burst is written at a block 464. The next step is to update average track time correction by the difference to the present driver or PLL motor lock time as indicated at a block 466. Then the sequential operations are repeated returning to block 460, until the last burst on the track has been written identified at a decision block 468. Then the sequential operations continue to block 324 in FIG. 3.

In FIG. 7, there is shown a flow chart illustrating an alternative self-servo writing method of the invention beginning at a block 700. First master disk surface is erased as indicated at a block 702 in the alternative self-servo writing method. Erasing can be accomplished by turning on the head write current with a DC data signal while slowly moving the head across the master disk surface. To minimize the number of missed spots that occur if the head moves too fast during erasing, repeated passes over the disk can be made. By controlling the velocity such that the head moves less than one head width per disk revolution, erasing can be provided with a single pass. Constant velocity moves can be accomplished by back EMF sensing of the actuator motor to determine its velocity. Also when a large percentage of the disk surface is erased, for example, such as more than 90%, then this self-servo writing method can be performed.

Next a clock track is written at one of the crash stops, such as the ID crash stop as indicated at a block 704. A stable clock source, such as a crystal clock, is used to write a required number of clocks on the disk using a single head at the block 704. After a clock track is written, the number of clocks actually written for one revolution is counted using an index mark encoded in the clock data to determine when to start and stop counting. When the disk is rotating at the proper speed, the required number of clocks (N) are written on the disk and clock writing is complete. Otherwise, repeated clock writing trials and tests are made until exactly N clocks are written to the disk. Since the clock source is fixed in frequency, only the disk speed is varied for each clock writing trial until the correct number of N clocks are written.

Bursts of servo information are written over the clock track, periodically around the track as indicated at a block 706. Then each clock burst between the servo information bursts are divided into two halves, naming the first half the odd clock burst and the second half the even clock burst as indicated at a block 708. Next as indicated at a block 710, the head is moved using the odd clock track signal amplitude as a servo signal, until the amplitude drops to a predetermined value T1, for example, such as 60% as indicated in a decision block 712. Then even clock burst and servo information are written for this head position while servoing and synchronizing the system timing off the odd clock burst on the previous track as indicated at a block 714. At block 714, the servo information is written aligned in time with the servo burst on the previous track.

Next as indicated at a block 716, the head is moved using the even clock track signal amplitude as a servo signal until the amplitude drops to the predetermined value T1, as indicated in a decision block 718. Then odd clock burst is written for this head position while servoing and synchronizing the system timing off the even clock burst on the previous track as indicated at a block 720. Then the sequential steps are repeated returning to block 710 until the head is moved all the way across the disk to the OD crash stop as indicated at a decision block 722 to complete the servo writing process. Then a calibration pattern is written between each odd and even clock bursts where no servo pattern had been written previously over the disk surface. The calibration patterns are written using the servo patterns for positioning the head as indicated at a block 724. After writing the entire surface with the calibration servo patterns at block 724, then each calibration servo pattern is read back as indicated at a block 726 in order to determine any offsets, for example due to head geometric effects and the coarse positioning used in blocks 710 and 716, as indicated at a block 726. Identified offsets are stored in an offset table as indicated at a block 728. Then moving to a next track, calibration patterns are repeatedly read at block 726 and stored in the offset table at the block 728 until all tracks have been read as identified at a decision block 730. Then the calibration patterns are rewritten as indicated at a block 732, using the stored offset table for position correction adjustments. The rewritten calibration patterns are evenly spaced at the proper track spacing and then serve as the master pattern for the disk file. The originally written servo patterns are no longer needed and can be overwritten. For sector servo or hybrid servo files, the servo information and clock information between servo bursts can be written on the other surfaces.

Referring now to FIG. 8, there is shown a flow chart illustrating sequential steps for read back of the calibration patterns and rewriting the calibration patterns at blocks 726–732 of FIG. 7. The sequential operations begin at a first track as indicated at a block 802. Then servo information or servo pattern is read as indicated at a block 804 to determine an average for the track. Next the calibration patterns for that track are read as indicated at a block 806 to determine an average calibration value. The difference between the calibration and servo pattern averages is recorded as indicated at a block 808. Unless the last track is identified at a decision block 810, then the sequential operation continues with a next adjacent track as indicated at a block 812. After all the servo and calibration patterns from the last track have been read and the differences recorded, then an average value of all recorded differences is calculated as indicated at a block 814. Then the identified average value is subtracted from each recorded difference to store the offset table as indicated at a block 816. Then the calibration patterns are rewritten, using the stored offset table for position correction adjustments, as indicated at a block 818. The sequential steps at blocks 802–818, inclusive, then can be repeated to achieve the master pattern for the disk file.

While the invention has been described with reference to details of the illustrated embodiment, these details are not intended to limit the scope of the invention as defined in the appended claims.

What is claimed and desired to be secured by Letters Patent of the United States is:

1. A method for writing servo patterns in a direct access storage device including a plurality of data storage media mounted for simultaneous rotation about an axis and an actuator for moving each of a plurality of transducer means relative to an associated data storage media for reading and writing data to the associated data storage media, said method comprising the steps of:

utilizing each of said plurality of transducer means and writing a data pattern to respective data storage media;

identifying one of said plurality of transducer means having a widest head; and saving said identified transducer means having said widest head as a reference head for writing servo patterns to said data storage media.

2. A method for writing servo patterns in a direct access storage device as recited in claim 1 wherein said step of identifying one of said plurality of transducer means having a widest head includes the steps of: selecting one of said plurality of transducer means and moving said selected one of said plurality of transducer means by a selected offset.

3. A method for writing servo patterns in a direct access storage device as recited in claim 2 includes the steps of measuring and saving an original amplitude of each of said plurality of transducer means and measuring and saving an offset amplitude of each of said plurality of transducer means.

4. A method for writing servo patterns in a direct access storage device as recited in claim 3 includes the steps of comparing each said offset amplitude with said original amplitude of each of said plurality of transducer means.

5. A method for writing servo patterns in a direct access storage device as recited in claim 4 includes the steps of identifying one of said plurality of transducer means having a maximum ratio to identify said one of said plurality of transducer means having a widest head.

6. A method for writing servo patterns in a direct access storage device as recited in claim 1 wherein said step of saving said identified transducer means having said widest head for referencing the writing servo patterns to said data storage media includes the step of referencing a written pitch of the written servo patterns to said widest head.

7. A method for writing servo patterns in a direct access storage device as recited in claim 1 wherein said step of saving said identified transducer means having said widest head for referencing the writing servo patterns to said data storage media includes the step of selecting said identified transducer means having said widest head as a reference head for writing servo patterns to said data storage media.

8. A self servo writing file comprising:

a plurality of data storage media mounted for simultaneous rotation about an axis;

an actuator for moving each of a plurality of transducer means relative to an associated data storage media for reading and writing data to the associated data storage media, means for writing a data pattern to respective data storage media utilizing each of said plurality of transducer means;

means for identifying one of said plurality of transducer means having a widest head; and means for saving said identified transducer means having said widest head as a reference head for writing servo patterns to said data storage media.

9. A self servo writing file as recited in claim 8 further includes a housing containing said plurality of data storage media and said plurality of transducer means.

10. A self servo writing file as recited in claim 9 wherein said means for saving said identified transducer means having said widest head for referencing the writing servo patterns to said data storage media includes means for referencing a written pitch of the written servo patterns to said widest head.

11. A self servo writing file as recited in claim 10 wherein said means for saving said identified transducer means having said widest head for referencing the writing servo patterns to said data storage media includes means for selecting said identified transducer means having said widest head as a reference head for writing servo patterns to said data storage media.

12. A self servo writing file as recited in claim 8 wherein said means for identifying said one of said plurality of transducer means having a widest head includes means for measuring and saving an original amplitude of each of said plurality of transducer means and means for moving and for measuring and saving an offset amplitude of each of said plurality of transducer means.

13. A self servo writing file as recited in claim 12 further includes means for identifying one of said plurality of transducer means having a maximum ratio of said original amplitude and said offset amplitude to identify said one of said plurality of transducer means having a widest head.

* * * * *